United States Patent [19]

McDonald

[11] Patent Number: 5,111,478
[45] Date of Patent: May 5, 1992

[54] METHOD AND APPARATUS FOR PROVIDING SIGNAL SYNCHRONIZATION IN A SPREAD SPECTRUM COMMUNICATION SYSTEM

[75] Inventor: James A. McDonald, Buffalo Grove, Ill.

[73] Assignee: Motorola, Inc., Schaumburg, Ill.

[21] Appl. No.: 648,472

[22] Filed: Jan. 31, 1991

[51] Int. Cl.$^5$ .............................................. H04L 27/30
[52] U.S. Cl. .......................................... 375/1; 380/34; 375/106; 375/115; 375/116
[58] Field of Search .................... 375/1, 106, 111, 113, 375/115, 116; 380/34

[56] References Cited

U.S. PATENT DOCUMENTS 4,092,601 5/1978 Lee et al. ............................. 375/1 X
4,649,549 3/1987 Halpern et al. ...................... 375/1 X

OTHER PUBLICATIONS

Dixon, Robert C., *Spread Spectrum Systems 2nd Ed.*, John Wiley & Sons, New York, N.Y., 1984, chapters 1, 2 and 6.

Primary Examiner—Bernarr E. Gregory
Attorney, Agent, or Firm—Shawn B. Dempster

[57] ABSTRACT

A method and apparatus is provided for synchronizing a spread spectrum communication site. The communication site receives a spread message signal from over a radio communication channel. Subsequently, the communication site synchronizes the received spread message signal with an estimate of the received spread message signal. The estimated received signal is a function of a predetermined message signal and a predetermined spreading code. The received and the estimated received spread message signals are synchronized by using a sliding correlator to incrementally increase the phase shift between the received and the estimated received spread message signal until the received and the estimated received spread message signals are synchronized. The communication site limits the increase of the phase shift between the received and the estimated received spread message signal to a predetermined maximum phase shift magnitude which is derived from known operating environment parameters of the spread spectrum communication site.

32 Claims, 2 Drawing Sheets

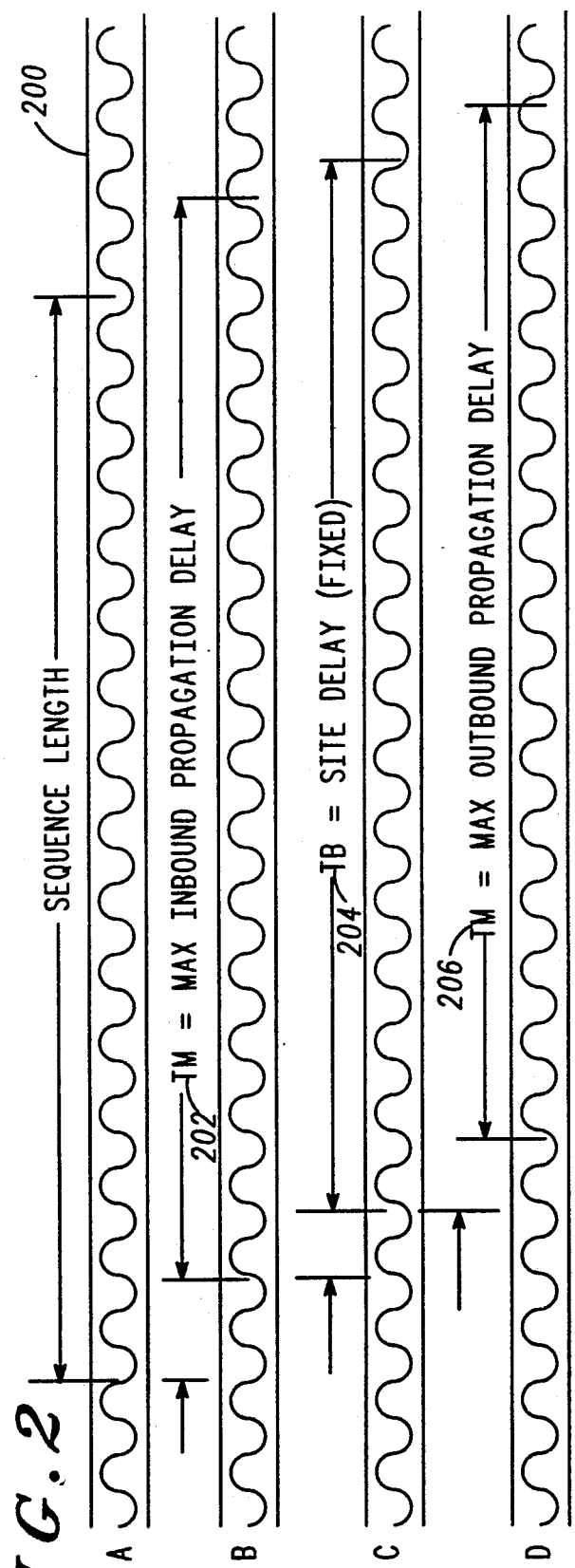

METHOD AND APPARATUS FOR PROVIDING SIGNAL SYNCHRONIZATION IN A SPREAD SPECTRUM COMMUNICATION SYSTEM

FIELD OF THE INVENTION

The present invention relates to communication systems which employ spread-spectrum signals and, more particularly, to a method and apparatus for providing signal synchronization between a transmitter and receiver in a spread spectrum communication system.

BACKGROUND OF THE INVENTION

Communication systems take many forms. Reference may be made to a book by Robert C. Dixon entitled *Spread Spectrum Systems*, John Wiley & Sons, New York, 1984, which describes many aspects of communication systems. In general, the purpose of a communication system is to transmit information-bearing signals from a source, located at one point, to a user destination, located at another point some distance away. A communication system generally consists of three basic components: transmitter, channel, and receiver. The transmitter has the function of processing the message signal into a form suitable for transmission over the channel. This processing of the message signal is referred to as modulation. The function of the channel is to provide a physical connection between the transmitter output and the receiver input. The function of the receiver is to process the received signal so as to produce an estimate of the original message signal. This processing of the received signal is referred to as demodulation.

Two types of two-way communication channels exist, namely, point-to-point channels and point-to-multipoint channels. Examples of point-to-point channels include wirelines (e.g., local telephone transmission), microwave links, and optical fibers. In contrast, point-to-multipoint channels provide a capability where many receiving stations may be reached simultaneously from a single transmitter (e.g., cellular radio telephone communication systems). These point-to-multipoint systems are also termed Multiple Address Systems (MAS).

Analog and digital transmission methods are used to transmit a message signal over a communication channel. The use of digital methods offers several operational advantages over analog methods, including but not limited to: increased immunity to channel noise and interference, flexible operation of the system, common format for the transmission of different kinds of message signals, improved security of communication through the use of encryption, and increased capacity.

These advantages are attained at the cost of increased system complexity. However, through the use of very large-scale integration (VLSI) technology, a cost-effective way of building the hardware has been developed.

To transmit a message signal (either analog or digital) over a band-pass communication channel, the message signal must be manipulated into a form suitable for efficient transmission over the channel. Modification of the message signal is achieved by means of a process termed modulation. This process involves varying some parameter of a carrier wave in accordance with the message signal in such a way that the spectrum of the modulated wave matches the assigned channel bandwidth. Correspondingly, the receiver is required to recreate the original message signal from a degraded version of the transmitted signal after propagation through the channel. The re-creation is accomplished by using a process known as demodulation, which is the inverse of the modulation process used in the transmitter.

In addition to providing efficient transmission, there are other reasons for performing modulation. In particular, the use of modulation permits multiplexing, that is, the simultaneous transmission of signals from several message sources over a common channel. Also, modulation may be used to convert the message signal into a form less susceptible to noise and interference.

For multiplexed communication systems, the system typically consists of many remote units (i.e., subscriber units) which require active service over a communication channel for short or discrete intervals of time rather than continuous sevice on a communication channel at all times. Therefore, communication systems have been designed to incorporate the characteristic of communicating with many remote units for brief intervals of time on the same communication channel. These systems are termed multiple access communication systems.

One type of multiple access communication system is a frequency division multiple access (FDMA) system. In a FDMA system, the communication channel is divided into several narrow frequency bands. Individual communication channel links are established between two communication units within one of these narrow frequency bands. These communication links are maintained for discrete amounts of time while the two communication units transmit and receive signals. During particular communication links between the two communication units, the communication system does not allow other communication units access to the narrow frequency band within the communication channel which is being utilized by the communication units in the particular communication link.

Another type of multiple access communication system is a time division multiple access (TDMA) system. In a TDMA system, the communication channel is divided into time slices of a time frame to allow communication links between two communication units to exist in the same communication channel simultaneously, but at different time slices. This is accomplished by assigning particular time slices of a time frame to a particular communication link and other time slices to other communication links. During these particular communication links between the two communication units, the communication system does not allow other communication units access to the time slice of the time frame within the communication channel which is being utilized by the communication units in the particular communication link.

Further, another type of multiple access communication system is a spread spectrum system. In a spread spectrum system, a modulation technique is utilized in which a transmitted signal is spread over a wide frequency band within the communication channel. The frequency band is much wider than the minimum bandwidth required to transmit the information being sent. A voice signal, for example, can be sent with amplitude modulation (AM) in a bandwidth only twice that of the information itself. Other forms of modulation, such as low deviation frequency modulation (FM) or single sideband AM, also permit information to be transmitted in a bandwidth comparable to the bandwidth of the information itself. However, in a spread spectrum system, the modulation of a signal to be transmitted often includes taking a baseband signal (e.g., a voice channel) with a bandwidth of only a few kilohertz and distributing the signal to be transmitted over a frequency band that may be many megahertz wide. This is accomplished by modulating the signal to be transmitted with the information to be sent and with a wideband encoding signal.

Unlike FDMA and TDMA systems, in spread spectrum systems, a signal may be transmitted in a channel in which the noise power is higher than the signal power. The modulation and demodulation of the message signal using spread spectrum techniques provides a signal-to-noise gain which enables the recovery of the message signal from a noisy communication channel. The greater the signal-to-noise ratio for a given system equates to: (1) the smaller the bandwidth required to transmit a message signal with a low rate of error, or (2) the lower the average transmitted power required to transmit a message signal with a low rate of error over a given bandwidth.

Three general types of spread spectrum communication techniques exist, including:

the modulation of a carrier by a digital code sequence whose bit rate is much higher than the information signal bandwidth. Such systems are referred to as "direct sequence" modulated systems.

carrier frequency shifting in discrete increments in a pattern dictated by a code sequence. These systems are called "frequency hoppers". The transmitter jumps from frequency to frequency within some predetermined set; the order of frequency usage is determined by a code sequence. Similarly "time hopping" and "time-frequency hopping" have times of transmission which are regulated by a code sequence.

pulse-FM or "chirp" modulation in which a carrier is swept over a wide band during a given pulse interval.

Information (i.e., the message signal) can be embedded in the spectrum signal by several methods. One method is to add the information to the spreading code before it is used for spreading modulation. This technique can be used in direct sequence and frequency hopping systems. It will be noted that the information being sent must be in a digital form prior to adding it to the spreading code because the combination of the spreading code, typically a binary code, involves module-2 addition. Alternatively, the information or message signal may be used to modulate a carrier before spreading it.

Thus, a spread spectrum system must have two properties: (1) the transmitted bandwidth should be much greater than the bandwidth or rate of the information being sent, and (2) some function other than the information being sent is employed to determine the resulting modulated channel bandwidth.

The essence of the spread spectrum communication involves the art of expanding the bandwidth of a signal, transmitting the expanded signal, and recovering the desired signal by remapping the received spread spectrum into the original information bandwidth. Furthermore, in the process of carrying out this series of bandwidth trades, the purpose of spread spectrum techniques is to allow the system to deliver error-free information in a noisy signal environment.

Spread spectrum communication systems can be multiple access systems like FDMA and TDMA communication systems. One type of multiple access spread spectrum system is a code division multiple access (CDMA) system. In a CDMA system, communication between two communication units is accomplished by spreading each transmitted signal over the frequency band of the communication channel with a unique user spreading code. As a result, transmitted signals are in the same frequency band of the communication channel and are separated only by unique user spreading codes. Particular transmitted signals are retrieved from the communication channel by despreading a signal representative of the sum of signals in the communication channel with a user spreading code related to the particular transmitted signal which is to be retrieved from the communication channel. A CDMA system may use direct sequence or frequency hopping spreading techniques.

Initial synchronization of signals between two communication sites which are communicating with each other in a spread spectrum communication system is an important aspect of the process of transmitting signals between the two communication sites. Synchronization of the two communication sites is necessary to allow the despreading of the received signals by a spreading code which is synchronized between the two communication sites so that the originally transmitted signal can be recovered from the received signal. Synchronization is achieved when the received signal is accurately timed in both its spreading code pattern position and its rate of chip generation with respect to the receiving communication site's spreading code.

One of the problems associated with synchronization is that the techniques used to synchronize two signals are relatively expensive to implement. In communication systems having sophisticated and relatively expensive central communication sites which serve a plurality of relatively inexpensive remote communication sites, it is desirable to reduce the cost of synchronization systems in the remote communication sites while not increasing the cost of the central communication sites. The present invention can be implemented in such central/remote communication site systems to reduce the cost of the remote communication site synchronization hardware/software while nominally increasing the synchronization hardware/software in the central communication sites.

In spread spectrum systems, with respect to synchronization, two general areas of uncertainty of the signal exist which must be resolved before a received spread spectrum signal can be recovered. These areas of uncertainty are spreading code phase and carrier frequency. In addition, spreading code clock rate can be a source of synchronization uncertainty. Most of this uncertainty may be eliminated by utilizing accurate frequency sources in both communication sites which are communicating with each other. However, some uncertainty cannot be eliminated by the use of accurate frequency sources. Doppler-related frequency errors typically cannot be predicted and will affect the carrier frequency. The amount of Dopper-related frequency uncertainty present in a received signal is a function of the relative velocity of the receiver which received the signal with respect to the transmitter which transmitted the signal, as well as the frequency (or frequency range) at which the signal was transmitted. Further, if at least one of the two communication sites in a communication link is mobile communication site, then a relative spreading code phase change will occur with each change in relative position of the mobile communication site with respect to the other communication site in the communication link. Furthermore, fixed-position communication sites can experience variations in spreading code phase and carrier frequency due to signal propagation-path-length changes in the communication channel.

One of the simplest of all synchronization techniques involves using a sliding correlator. In the sliding correlator, a spreading code generator operates at a rate different from the rate at which a spreading code generator associated with a transmitter which transmitted the signal to be correlated operates. The effect is that the two spreading code sequences slip in phase with respect to each other, and if viewed simultaneously, the spreading codes would seem to slide past each other until the point of coincidence is reached.

More particularly, a sliding correlator receives a spread spectrum signal which is a function of a particular spreading code and generates a signal locally which is a function of a locally-generated spreading code which is substantially similar to the particular spreading code. Subsequently, the sliding correlator compares the received signal with the locally-generated signal. If the two signals are not determined to be aligned, then the sliding correlator phase shifts the local signal with respect to the received signal and loops back to compare the phase shifted local signal with the received signal. This process continues until the sliding correlator determines that the two signals are aligned at which point the total phase shift of the local signal is stored by the sliding correlator for subsequent use. The total phase shift and the locally-generated spreading code are used to despread subsequently received spread spectrum signals which have been spread with spreading codes which are substantially similar to the locally generated spreading code, but phase-shifted.

The primary advantage of the sliding correlator is its simplicity. However, the primary disadvantage in the use of sliding correlators in spread spectrum communication systems has been that a relatively large amount of uncertainty of the relative spreading code phase between transmitted and received spread spectrum signals has existed. Thus, it has been necessary to compare most of the possible spreading code phase positions of a locally generated signal to a received signal. This extensive comparison has been impractical for real-time operations such as radiotelephone communication. Therefore, it has been necessary to find ways to decrease the time of synchronization while using a sliding correlator. One technique is to limit the range of phase positions which must be compared before synchronization can be accomplished.

One way to limit the range of phase positions which must be compared is to use preamble synchronization sequence. Preamble synchronization sequences are short spreading codes (e.g., 100 to 10,000 bits). The time of synchronization of a received signal is directly related to the length of the spreading code. Because the spreading codes are short, the time of synchronization for a received signal is short. After synchronization, communication between communication sites is continued with a longer spreading code (e.g., $10^{20}$ bits or more in length). Unfortunately, the use of preamble synchronization sequences having relatively short spreading codes has a weakness. The weakness is that these short spreading codes tend to be more vulnerable to false correlations due to noise in the received signal because there are a relatively small number of maximal length spreading codes for these short spreading codes. Thus, the use of short spreading codes, in a large communication system, would require communication sites to share the same maximal length spreading codes, which leads to possible false correlation with a communication site to which the signals were intended to be sent. Therefore, to eliminate false correlations the use of long spreading codes (e.g., on the order of $10^{20}$ bits or more) is preferable.

Another closely-related way to limit the range of phase positions which must be compared is to use easily acquirable or synchronizable spreading codes. An example of an easily acquirable spreading code is a JPL component code. JPL component codes are made up to a plurality of shorter length maximal codes, each of a different length. Because JPL component codes consist of more than one maximal length code, they have one more autocorrelation point than component in the code (e.g., if a JPL code is made up of a $2^5-1$ maximal code, a $2^4-1$ maximal code and a $2^3-1$ maximal code, then there are four autocorrelation points associated with the JPL code). In contrast, a single maximal code having a similar length as the JPL code would have a single autocorrelation point. Moreover, all but one of these autocorrelation points are associated only (and separately) with the individual codes making up the composite JPL code. The highest correlation point corresponds to total composite spreading code synchronization.

Synchronization, by using JPL component codes, is accomplished by first cross-correlating one of the component codes with the composite code. Once this component code reaches the point of synchronization with its mate, which is embedded in the composite code, a partial correlation occurs. The partial correlation is then the signal for the second component code cross-correlation to be initiated, which causes the partial correlation level to be increased. This process continues until all of the component codes making up the overall composite code are individually synchronized with their counterparts in the received signal. When all are individually synchronized, the correlation is the same as if the process had simply synchronized the composite code. The advantage of this technique is that it provides for rapid synchronization acquisition without the use of a preamble or anything other than the composite code itself. When the component codes are, for example, 200, 500 and 100 bits in length, then separate search processes over these individual lengths (a total of 1700 bits) can be accomplished much more rapidly than a search of the composite $10^8$ bits. However, this advantage in synchronization time is paid for by a decrease in the signal-to-noise ratio in the correlator output when all code components are not synchronized (i.e., susceptible to noise and interference).

The present invention overcomes the disadvantage of a sliding correlator by determining a maximum range of phase positions of a locally-generated signal that a sliding correlator must compare to a received signal. In addition, the present invention does not exhibit the vulnerability of the spreading code to false correlation that the use of synchronization preambles exhibits or the susceptibility to noise and interference that the use of JPL component code exhibits.

SUMMARY OF THE INVENTION

A method and apparatus is provided for synchronizing a spread spectrum communication site. The communication site receives a spread message signal from over a radio communication channel. Subsequently, the communication site synchronizes the received spread message signal with an estimate of the received spread message signal. The estimated received signal is a function of a predetermined message signal and a predetermined spreading code. The received and the estimated received spread message signals are synchronized by using a sliding correlator to incrementally increase the phase shift between the received and the estimated received spread message signal until the received and the estimated received spread message signals are synchronized. The communication site limits the increase of the phase shift between the received and the estimated received spread message signal to a predetermined maximum phase shift magnitude which is derived from known operating environment parameters of the spread spectrum communication site.

BRIEF DESCRIPTION OF THE DRAWINGS

FIG. 2 is a diagram detailing the timing relationship of signals in the preferred embodiment communication system.

DETAILED DESCRIPTION

Figure 1:
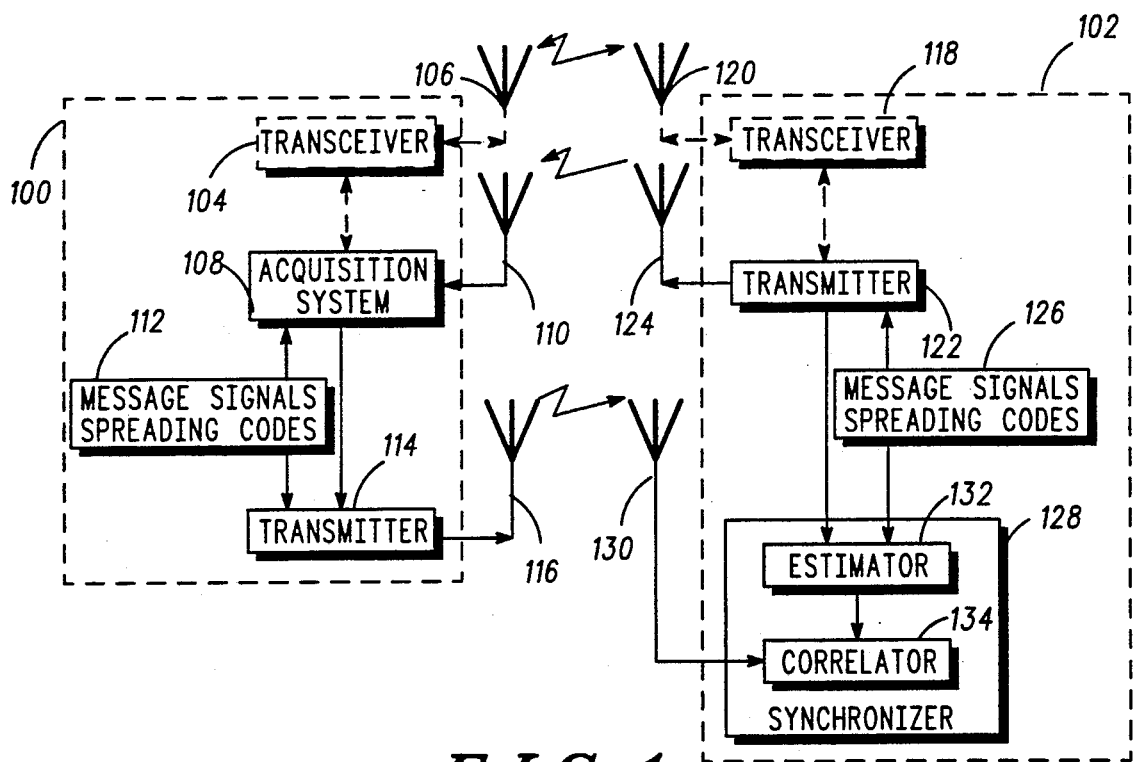
FIG. 1 is a diagram showing a preferred embodiment signal synchronizing mechanism for a communication system.

Any communication system must have at least two communication sites which are communicating with one another. However, many communication systems are not limited to only two communication sites. The foregoing discussion describes communication between two communication sites. It will be appreciated by those skilled in the art that the principals described below can be extended to more than two communication sites without departing from the scope of the present invention.

Referring now to FIG. 1, a preferred embodiment first communication site 102 and second communication site 100 are shown. As appreciated by those skilled in the art, each of the communication sites include further components necessary for performing other functions of the communication process. However, to implement the initial synchronization techniques of the preferred embodiment, the first and second communication sites 102, 100 must include components which perform the functions as described below.

Referring now to the first communication site 102, the first communication site 100 has a transmitter 122 which generates a first spread spectrum message signal from a function of a first message signal and a first spreading code available within a storage medium 126 in the first communication site 102. The storage medium 126 serves as a location within the first communication site 102 for other components to store or provide messages and/or other data to. For example, the first message signal could be a voice data signal which recently has been input into the first communication site 102 or merely a predetermined message signal stored provided to the first communication site 102. Similarly, for example, the first spreading code may be provided by a P/N spreading sequence (code) generator also included in the first communication site 102. The transmitter 122 also transmits the first spread message signal through antenna 124 over a communication channel to the second communication site 100.

Referring now to the second communication site 100, the second communication site 100 receives the first spread message signal via antenna 110 and provides it to a signal acquisition system 108. Signal acquisition system 108 determines which spreading code was used to generate the first message signal. This determination can be accomplished through any one of several traditional spread spectrum signal acquisition techniques including, but not limited to, comparing the received first spread message signal with functions of combinations of message signals and spreading codes stored in a storage medium 112 within the second communication site 100. Storage medium 112 has similar properties as storage medium 126 has in that it provides a way in which other components of the second communication site 100 can provide message signals and other data to the initial synchronization system. This comparison can include each of the possible phase shifts of a spreading code in combination with each of the message signals that the second communication site expects to receive from the first communication site 102. Such a comparison operation can require enormous amounts of time and hardware to accomplish. Therefore, in real time communication systems which require fast determinations of which spreading code was used, some parallel processing is usually incorporated into the acquisition system 108. Once the determination of which spreading code was used to generate the first spread message signal has been made, the acquisition system 108 provides the determined first spreading code to a transmitter 114. Transmitter 114 generates a second spread spectrum message signal from a function of a second message signal and a second spreading code associated with the determined first spreading code. The transmitter 114 subsequently transmits the second spread message signal through antenna 116 over a communication channel to the first communication site 102.

In one preferred embodiment, the first and second spreading codes are identical. Therefore, the first communication site 102 can expect that the second spread message signal received by it will be spread by the same spreading code that it used to transmit to the second communication site 100. In an alternative embodiment, the first and second spreading codes are not identical but at least somehow related. This relationship may be that the second spreading code is similar to the first spreading code but phase-shifted a predetermined amount from the first spreading code wherein the predetermined amount is known to both the first and second communication sites 102, 100 prior to the transmission of the second spread message signal over the communication channel to the first communication site 102. Alternatively, this relationship between the first and second spreading codes may be that the first and second spreading codes are a grouped pair known to both of the communication sites prior to transmission of the second spread message signal. More particularly, the first communication site 102 can expect that the second spread message signal received by it will be spread by a particular second spreading code associated with the first spreading code that it used to transmit the first spread message signal to the second communication site 100.

Similarly, in one preferred embodiment, the first and second message signals are identical. Therefore, the first communication site 102 can expect that the second spread message signal received by it will include the first message signal that it transmitted to the second communication site 100. In an alternative embodiment, the first and second message signals are not identical but at least somehow related. This relationship may be that the first and second message signals are a grouped pair known to both of the communication sites prior to transmission of the second spread message signal. More particularly, the first communication site 102 can expect that the second spread message signal received by it will include a particular second message signal associated with the first message signal that it transmitted to the second communication site 100.

The first communication site 102 receives the second spread message signal from over the communication channel through antenna 130. Antenna 130 provides the received second spread message signal to a synchronizer 128. Synchronizer 128 generates an estimated second message signal from a function of the known second message signal with estimator 132, and the known second spreading code stored in storage medium 126. Alternatively, if the expected to be received second spread message signal is identical to the first spread message signal transmitted by the first communication site, the transmitter 122 can provide the first spread message signal to the synchronizer 128 for subsequent generation of the estimated second spread message signal. Subsequent to generating the estimated second spread message signal, the synchronizer 128 synchronizes the received and the estimated second spread message signals by using a sliding correlator 134 to incrementally increase the phase shift between the received and the estimated second spread message signals until the received and the estimated spread message signals are synchronized. In an alternative embodiment, the synchronizer 128 further includes a mechanism for limiting the increase of the phase shift between the received and the estimated second spread message signal to a predetermined maximum phase shift magnitude which is derived from known operating environment parameters of the first communication site 102.

Referring now to FIG. 2, these known operating environment parameters include, but are not limited to, the distance between the first and second communication site 102, 100, respectively and the medium through which spread message signal transmissions are travelling in the radio communication channel (e.g., air or vacuum). In a typical communication system in which the first and second communication sites 102, 100 are operating, the first and second communication sites 102, 100 are a fixed geographic distance from one another. Alternatively, the first and second communication sites vary in distance from one another, but within a fixed distance range. By knowing that the two communication sites are at least within a particular distance of each other, the communication system can be optimized to take advantage of this knowledge. In line a of FIG. 2, a spread signal with a spreading sequence (code) of a particular length is shown. As previously discussed, these spread signals can be extremely long and it can be time consuming to search through during an initial signal synchronization step. However, by knowing the maximum distance that the two communication sites are apart, a maximum propagation delay of a signal travelling over the radio communication channel between the two communication sites can be determined. In line b of FIG. 2, a maximum inbound propagation delay 202 is shown. This inbound delay 202 is the delay experienced by the first spread message signal in travelling through the communication channel from the first communication site 102 to the second communication site 100. Similarly, in line d of FIG. 2, a maximum outbound propagation delay 206 is shown. This outbound delay 206 is the delay experienced by the second spread message signal in travelling through the communication channel from the second communication site 100 to the first communication site 102. In addition, as shown in line c of FIG. 2, a delay 204 between the reception of the first spread message signal and the transmission of the second spread message signal occurs in the second communication site 100. This delay 204 is from the time that it takes the second communication site 100 to determine the first spreading code used to generate the first spread message signal and to generate the second spread message signal. This delay 204 at the second communication site 100 is fixed in that it will take approximately the same amount of time to process any first spread message signal sent to it by the first communication site 102. Therefore, by knowing these signal propagation delays 202, 204, and 206, a maximum propagation delay which is the sum of each of these propagation delays 202, 204, and 206 can be determined. This known maximum propagation delay can be used to limit the increase of the phase shift magnitude between the received and the estimated second spread message signals to a maximum phase shift based on this maximum propagation delay in the communication system. Alternatively, since the second communication site delay 204 can be fixed, the maximum phase shift can be limited based on the inbound delay 202 and outbound delay 206, but starting from a preset phase shift based on the second communication site delay 204.

Referring now to FIG. 1, in an alternative embodiment, the first and second communication sites 102, 100 further include a transceiver and antenna combination 118, 120 and 104, 106, respectfully. The two antenna and transceiver combinations form a separate communication link for communication over a communication channel between the first and second communication sites 102, 100. The communication link can be accomplished with a signalling technique other than spread spectrum such as FDMA or TDMA. This separate communication link can be used to send information to each of the communication sites prior to the start of spread spectrum transmissions.

For instance, the second communication site 100 can transmit a request via transceiver 104 and antenna 106 to the first communication site 102 to begin transmitting the first spread message signal over the radio communication channel so that the second communication site 100 can reduce the search range, during the acquisition process, over possible phase shifts of each possible spreading code from which the subsequent first spread message signal transmission could be generated. In an alternative embodiment, the second communication site 100 also transmits the spreading code and phase shift of the spreading code to use in the transmission of the first spread message signal.

In an alternative embodiment, the first communication site 102 can transmit a message via transceiver 118 and antenna 120 to the second communication site 100 notifying the second communication site 100 that a transmission of the first spread message signal over the radio communication channel is beginning so that the second communication site 100 can reduce the search range, during the acquisition process, over possible phase shifts of each possible spreading code from which the subsequent first spread message signal transmission could be generated. In an alternative embodiment, the first communication site 102 also transmits the spreading code and phase shift of the spreading code which will be used in the transmission of the first spread message signal.

These principals may be applied to particular spread spectrum communication systems such as CDMA spread spectrum radio telephone cellular communication systems and the like. In such a cellular communication system, one communication site is a base (or central) communication site and the other communication site is a mobile (or subscriber) communication site. In addition, a cellular communication system typically has several base and mobile communication sites. The base communication sites typically communicate with particular mobile sites in their geographic proximity as well as other nearby base communication sites. Because base communication sites can communicate with one another, additional features may be incorporated into the cellular communication system related to synchronization of signals transmitted over a radio communication channel. For example, when a particular mobile communication site transmits a spread message signal over the radio communication channel, more than one base communication site may receive the spread message signal. The cellular communication system can be configured in several ways to handle this situation. In one configuration, each of the base communication sites which receives the spread message signal transmits a reply spread message signal used in synchronization to the mobile communication site which is coded so that the mobile communication site can determine which reply spread message signal was transmitted by each of the base communication sites. The mobile communication site then determines which base communication site it wants to communicate with on subsequent communications and transmits to the other base communication sites a spread message signal telling them to cease transmitting to it. In an alternative configuration, each of the base communication sites which receive the transmission from the mobile communication site communicate with one another and decide which of them is going to transmit a reply message signal to the mobile communication site.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed. For example, individual antennae 106, 110, and 116 may be a single antenna with a switch to switch between the various inputs. Similarly, the transceiver 104 and transmitter 114 functions may be performed by a single device. These and other permutations are possible without departing from the spirit and scope of the invention as claimed.

What is claimed is:

1. A spread spectrum communication site having signal synchronizing capability, comprising:
   (a) receiving means for receiving a spread message signal from over a radio communication channel; and
   (b) synchronizing means for synchronizing the received spread message signal with an estimate of the received spread message signal, the synchronizing means comprising:
      (i) means for generating the estimated received spread message signal as a function of a predetermined message signal and a predetermined spreading code; and
      (ii) means for synchronizing the received and the estimated received spread message signals by using a sliding correlator to incrementally increase the phase shift between the received and the estimated received spread message signal until the received and the estimated received spread messge signals are synchronized, the means for synchronizing limiting the increase of the phase shift between the received and the estimated received spread message signal to a predetermined maximum phase shift magnitude which is derived from known operating environment parameters of the spread spectrum communication site.

2. The spread spectrum communication site of claim 1 wherein the received spread message signal was generated prior to transmission over the communication channel with a spreading code which is substantially similar to the predetermined spreading code used to generate the estimated received spread message signal.

3. The spread spectrum communication site of claim 1 wherein the received spread message signal was generated prior to transmission over the communication channel with a message signal which is substantially similar to the predetermined message signal used to generate the estimated received spread message signal.

4. A spread spectrum communication site having signal synchronizing capability, comprising:
   (a) receiving means for receiving a first spread message signal derived from a first message signal and a first spreading code from over a radio communication channel;
   (b) determining means for determining the first spreading code from which the first spread message signal was derived; and
   (c) transmitting means for enabling synchronization of transmitted spread message signals with another communication site, the transmitting means comprising:
      (i) means for generating a second spread message signal as a function of a second message signal and a second spreading code associated with the determined first spreading code; and
      (ii) means for transmitting the second spread message signal over the radio communication channel to another communication site.

5. The spread spectrum signal synchronizing system of claim 4 wherein the first spreading code is substantially similar to the second spreading code.

6. The spread spectrum signal synchronizing system of claim 4 wherein the second spreading code is known to the communication site prior to the transmission of the first spread message signal over the radio communication channel.

7. The spread spectrum signal synchronizing system of claim 4 wherein the first mesage signal is substantially similar to the second message signal.

8. The spread spectrum signal synchronizing system of claim 4 wherein the second message signal is known to the communication site prior to the transmission of the first spread message signal over the radio communication channel.

9. A spread spectrum signal synchronizing system, comprising:
   (a) first communication site, comprising:

(i) a transmitter comprising means for generating a first spread message signal as a function of a first message signal and a first spreading code, the transmitter further comprising means for transmitting the first spread messge signal over a radio communication channel;

(ii) receiving means for receiving a second spread message signal from over the radio communication channel; and (iii) synchronizing means for synchronizing the received second spread message signal with an estimate of the received second spread message signal, the synchronizing means comprising means for generating an estimated second spread message signal as a function of a second message signal and a second spreading code associated with the first spreading code, the synchronizing means further comprising means for synchronizing the received and the estimated second spread message signals by using a sliding correlator to incrementally increase the phase shift between the received and the estimated second spread message signal until the received and the estimated second spread message signals are synchronized; and (b) second communication site, comprising:

(i) receiving means for receiving the first spread message signal from over the radio communication channel;

(ii) determining means for determining the first spreading code used to generate the received first spread message signal; and (iii) transmitting means for enabling synchronization of received spread message signals at the first communication site, the transmitting means comprising means for generating the second spread message signal as a funciton of the second message signal and the second spreading code associated with the determined first spreading code, the transmitting means further comprising means for transmitting the second spread message signal over the radio communication channel.

10. The spread spectrum signal synchronizing system of claim 9 wherein the synchronizing means comprises means for limiting the increase of the phase shift between the received and the estimated second spread message signal to a predetermined maximum phase shift magnitude which is derived from known operating environment parameters of the first communication site.

11. The spread spectrum signal synchronizing system of claim 9 wherein the first spreading code is substantially similar to the second spreading code.

12. The spread spectrum signal synchronizing system of claim 9 wherein the second spreading code is known to both the first and second communication site prior to the first communication site transmitting the first spread message signal over the radio communication channel.

13. The spread spectrum signal synchronizing system of claim 9 wherein the first message signal is substantially similar to the second message signal.

14. The spread spectrum signal synchronizing system of claim 9 wherein the second message signal is known to both the first and second communication site prior to the first communication site transmitting the first spread message signal over the radio communication channel.

15. The spread spectrum signal synchronizing system of claim 9 wherein the second communication site further comprises means for requesting the transmitter of the first communication site to begin transmitting the first spread message signal over the radio communication channel so that the second site can reduce the determining means search range of possible phase shifts of possible spreading codes used to generate the received first spread message signal.

16. The spread spectrum signal synchronizing system of claim 9 wherein the first communication site further comprises means for notifying the second communication site that transmission of the first spread message signal over the radio communication channel is beginning so that the second site can reduce the determining means search range of possible phase shifts of possible spreading codes used to generate the received first spread message signal.

17. A method of synchronizing a spread spectrum communication site, comprising:

(a) receiving a spread message signal from over a radio communication channel;

(b) generating an estimated received spread message signal as a function of a predetermined message signal and a predetermined spreading code; and (c) synchronizing the received and the estimated received spread message signals by using a sliding correlator to incrementally increase the phase shift between the received and the estimated received spread message signal until the received and the estimated received spread message signals are synchronized while limiting the increase of the phase shift between the recieved and the estimated received spread message signal to a predetermined maximum phase shift magnitude which is derived from known operating environment parameters of the spread spectrum communication site.

18. The method of claim 17 wherein the received spread message signal was generated prior to transmission over the communication channel with a spreading code which is substantially similar to the predetermined spreading code used to generate the estimated received spread message signal.

19. The method of claim 17 wherein the received spread message signal was generated prior to transmission over the communication channel with a message signal which is substantially similar to the predetermined message signal used to generate the estiamted received spread message signal 20. A method of synchronizing a spread spectrum communication site, comprising:

(a) receiving a first spread message signal derived from a first message signal and a first spreading code from over a radio communication channel;

(b) determining the first spreading code from which the first spread message signal was derived; and (c) enabling synchronization of transmitted spread message signals with another communication site by:

(i) generating a second spread message signal as a function of a second message signal and a second spreading code associated with the determined first spreading code; and (ii) transmitting the second spread message signal over the radio communication channel to another communication site.

21. The method of claim 20 wherein the first spreading code is substantially similar to the second spreading code.

22. The method of claim 20 wherein the second spreading code is known to the communication site prior to the transmission of the first spread message signal over the radio communication channel.

23. The spread spectrum signal synchronizing system of claim 20 wherein the first message signal is substantially similar to the second message signal.

24. The spread spectrum signal synchronizing system of claim 20 wherein the second message signal is known to the communication site prior to the transmission of the first spread message signal over the radio communication channel.

25. A method of synchronizing a spread spectrum communication system, comprising:
(a) generating a first spread message signal as a function of a first message signal and a first spreading code at a first communication site;
(b) transmitting from the first communication site the first spread message signal over a radio communication channel;
(c) receiving the first spread message signal from over the radio communication channel at a second communication site;
(d) determining at the second communication site the first spreading code used to generate the received first spread message signal;
(e) generating at the second communication site a second spread message signal as a function of a second message signal and a second spreading code associated with the determined first spreading code;
(f) transmitting from the second communication site the second spread message signal over the radio communication channel;
(g) receiving at the first communication site a second spread message signal from over the radio communication channel;
(h) generating at the first communication site an estimated second spread message signal as a function of the second message signal and the second spreading code associated with the first spreading code; and
(i) synchronizing the received and the estimated second spread message signals at the first communication site by using a sliding correlator to incrementally increase the phase shift between the received and the estimated second spread message signal until the received and the estimated second spread message signals are synchronized.

26. The method of claim 25 wherein the increase of the phase shift between the received and the estimated second spread message signal is limited to a predetermined maximum phase shift magnitude which is derived from known operating environment parameters of the first communication site.

27. The method of claim 25 wherein the first spreading code is substantially similar to the second spreading code.

28. The method of claim 25 wherein the second spreading code is known to both the first and second communication site prior to the first communication site transmitting the first spread message signal over the radio communication channel.

29. The method of claim 25 wherein the first message signal is substantially similar to the second message signal.

30. The method of claim 25 wherein the second message signal is known to both the first and second communication site prior to the first communication site transmitting the first spread message signal over the radio communication channel.

31. The method of claim 25 wherein the method further includes the step of the second communication site requesting the first communication site to begin transmitting the first spread message signal over the radio communication channel so that the second communication site can reduce the search range of possible phase shifts of possible spreading codes used to generate the received first spread message signal in the determining step.

32. The method of claim 25 wherein the method further includes the step of the first communication site notifying the second communication site that transmission of the first spread message signal over the radio communication channel is beginning so that the second communication site can reduce the search range of possible phase shifts of possible spreading codes used to generate the received first spread message signal in the determining step.

* * * * *